(No Model.)
O. C. MERRILL.
VEGETABLE PEELER.
No. 557,212.        Patented Mar. 31, 1896.
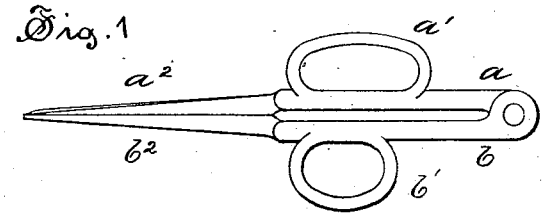
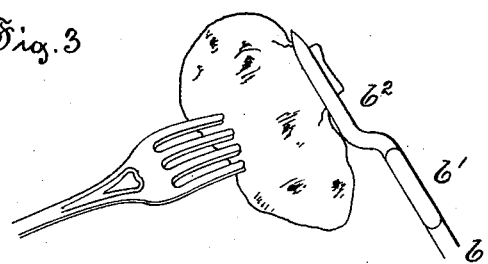
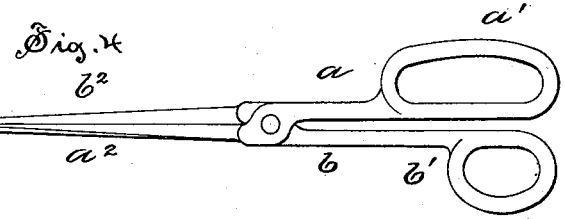
Witnesses
E. J. Hyde.
Inventor
Oliver C. Merrill,
Harry R. Williams,
Attorney
ANDREW B. GRAHAM, PHOTO-LITHO, WASHINGTON, D.C.

UNITED STATES PATENT OFFICE.

OLIVER C. MERRILL, OF HARTFORD, CONNECTICUT, ASSIGNOR TO THE AMERICAN SPECIALTY COMPANY, OF SAME PLACE.

VEGETABLE-PEELER.

SPECIFICATION forming part of Letters Patent No. 557,212, dated March 31, 1896.

Application filed December 21, 1894. Serial No. 532,614. (No model.)

*To all whom it may concern:*

Be it known that I, OLIVER C. MERRILL, a citizen of the United States, residing at Hartford, in the county of Hartford and State of Connecticut, have invented certain new and useful Improvements in Vegetable-Peelers, of which the following is a specification.

The invention relates to the class of devices that are used for peeling vegetables, and the object is to provide a simple, cheap, and convenient implement which can be utilized for removing the peel from hot vegetables—such as boiled Irish or sweet potatoes, beets, or similar foods which may be cooked with their skins or jackets on—so that the hand or thumb and fingers will not have to make contact with or touch the hot matter and become burned.

To this end the invention resides in an instrument which has a ground or sharpened blade and a gripping bill or jaw adapted to move toward and from the blade, the blade being sharpened, so that it can be readily inserted into the vegetable to break and raise the peel, and the bill making contact with the blade so the raised peel can be gripped between them, as between the peeling-knife and the thumb, utilized in the common mode of performing this operation of peeling vegetables.

Referring to the accompanying drawings, Figure 1 is a plan of one embodiment of the invention. Fig. 2 is an edge view of the same. Fig. 3 illustrates the manner of its use. Fig. 4 is a plan of a modified construction. Fig. 5 is an enlarged cross-section of the blade and bill. Fig. 6 is a similar view showing how the blade and bill might make contact, and Fig. 7 is a view of a modified form of the blade.

In the views $a$ and $b$ indicate a pair of metal rods, strips or bars that are hinged together so as to open and shut. These bars may be hinged by a pivot passing through them near one end, as a pair of dividers, Fig. 1, by a pivot passing through them at the middle, as a pair of scissors, Fig. 4, or they may be made movable toward each other in any other similar manner. Handles are formed on each of the bars and these usually have thumb and finger openings $a'$ $b'$ so arranged that the bars may be easily opened and closed, as desired, by one hand, although when the bars are normally held apart by a spring the handles need not be provided with the thumb and finger openings.

On the end of one of the bars $a$ is formed the blade $a^2$, which is sharpened, ground, or otherwise formed so that it can be easily thrust into the vegetable and beneath the peel to break and lift up a portion, so that it can be grasped for tearing it off. The blade is somewhat long, thin, and narrow, but, of course, it is wide enough to provide a sufficient surface to firmly hold the piece of vegetable-skin that is pressed against it by the bill, and it is preferred to offset the blade from the plane of the bar, as shown in Fig. 2, so that the hand can be kept away from the surface of the hot vegetable being peeled. The blade when ground or formed has a pointed end and usually both edges are sharpened by beveling off the outside, leaving a flat inner face, as shown in Fig. 5, and this blade may, if desired, have notches or saw-teeth in its lower edge, as shown in Fig. 7, that will readily puncture the skin of the vegetable and facilitate the breaking and starting up of the peel. On the end of the other bar $b$ and offset or otherwise arranged so as to be in the same plane as the blade is the bill or jaw $b^2$. This bill is preferably pointed to conform with the end of the blade; but its edges need not necessarily be sharpened, as are the edges of the blade, for the function of the bill is to move up and make contact with the blade, so as to grip and hold between them the piece of the vegetable-peel that is started in order that it may be torn off. The bill is usually formed so as to make a flat contact or engagement with the inner face of the blade, as shown in Fig. 5; but it may, if desired, be arranged to make the contact along the lower edge only, as shown in Fig. 6.

A fork or similar instrument is thrust into the hot vegetable to be peeled so as to hold it, and then the sharpened blade is run into the vegetable so as to break the skin and lift a piece of the peel, after which the bill is closed against the blade to grasp the edge of the raised piece of the peel, which is then torn off. This process is continued until all the peel has been torn from the vegetable.

The utensil is simple, cheap, and convenient. By means of it peel can be removed just as effectively as with a common paring-knife and the thumb—the instrumentalities used in the ordinary mode of paring vegetables—and there is no danger of burning the hands when this tool is utilized in place of the knife and thumb in peeling steaming-hot vegetables, for the flesh need in no wise come into contact with or touch the hot substance of the vegetable. The blade takes the place of the ordinary paring-knife and the bill answers for the thumb.

I claim as my invention—

A vegetable-peeler consisting of a pair of bars with a pivot passing through the bars and hinging them together, one of said bars having a handle-section bearing a handle part and an offset blade-section having a lower edge of some length that is sharpened so that it may be used to break the peel of a vegetable, and the other of said bars having a handle-section bearing a handle part and an offset bill-section having a blunted lower edge conforming to the sharpened edge of the blade-section, said bars being so hinged that the blade and bill sections move flatwise toward each other when closing and make gripping contact along the lower sharpened and blunted edges, substantially as specified.

OLIVER C. MERRILL.

Witnesses:
CHAS. FLINT,
H. R. WILLIAMS.